Jan. 1, 1963 J. H. CRANKSHAW 3,071,224
HIGH SPEED SYNCHRONIZING CLUTCH
Filed Sept. 16, 1959 6 Sheets-Sheet 1
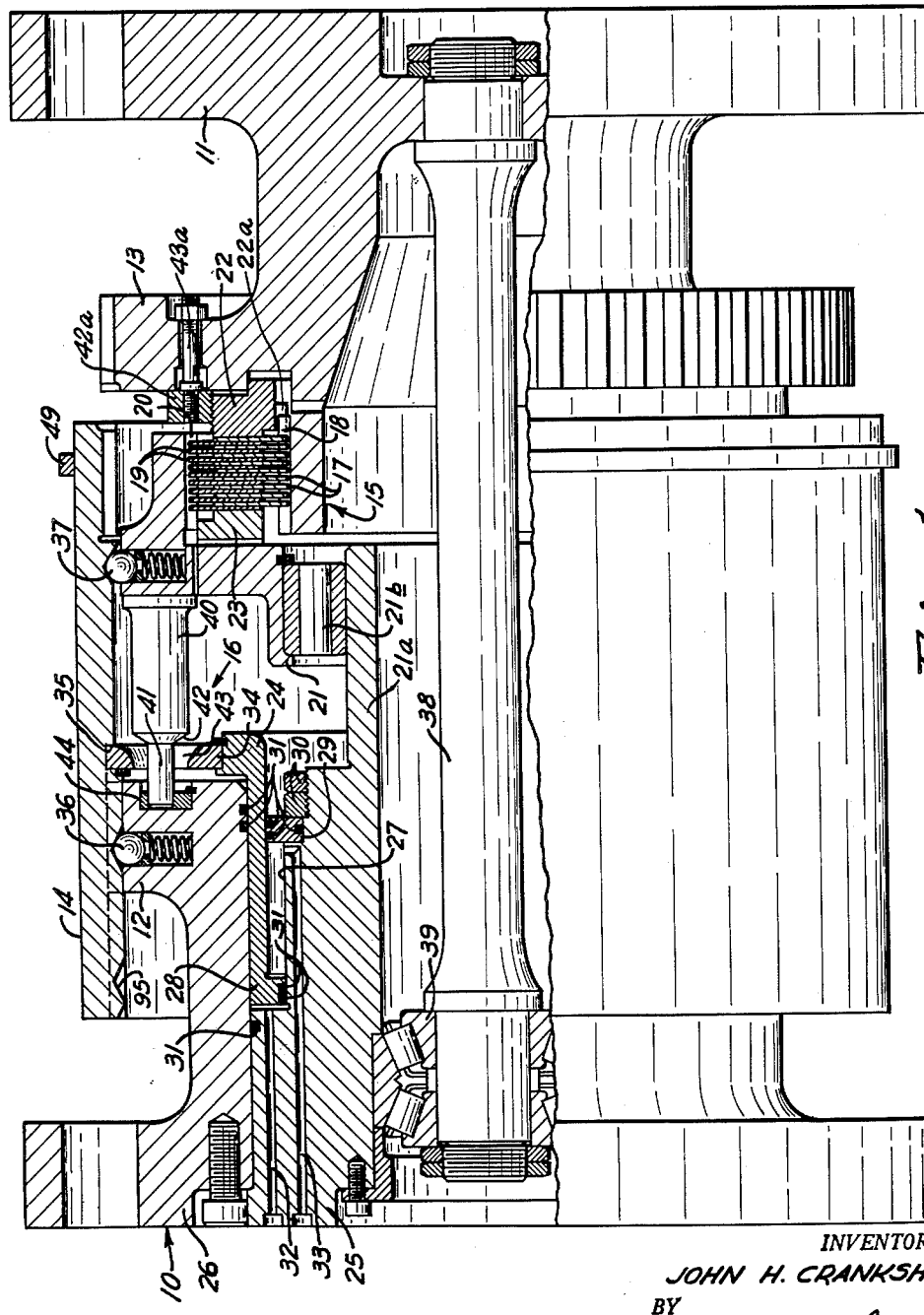
INVENTOR.
JOHN H. CRANKSHAW
BY
Brown, Critchlow, Frolick & Peckham
HIS ATTORNEYS

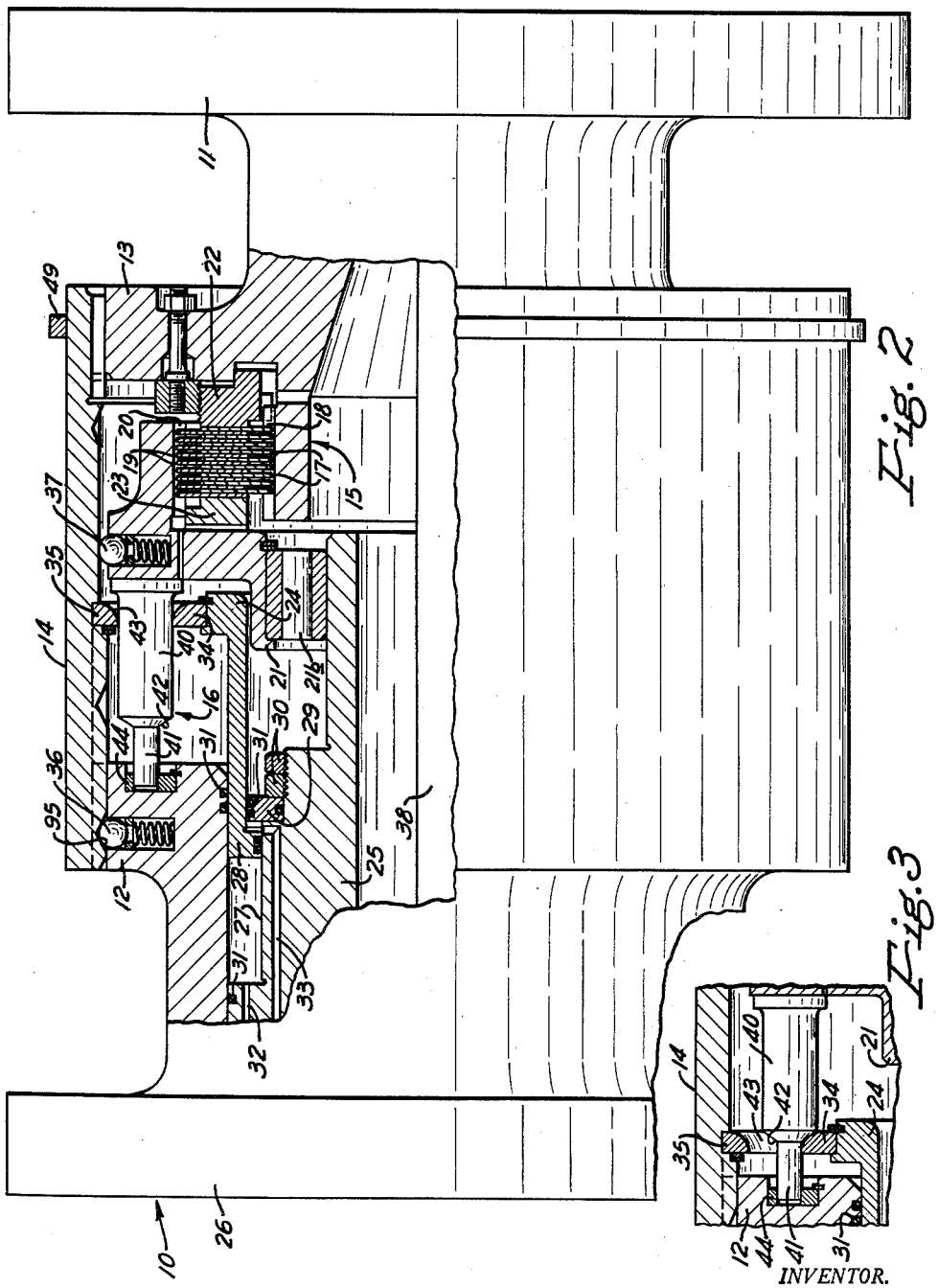

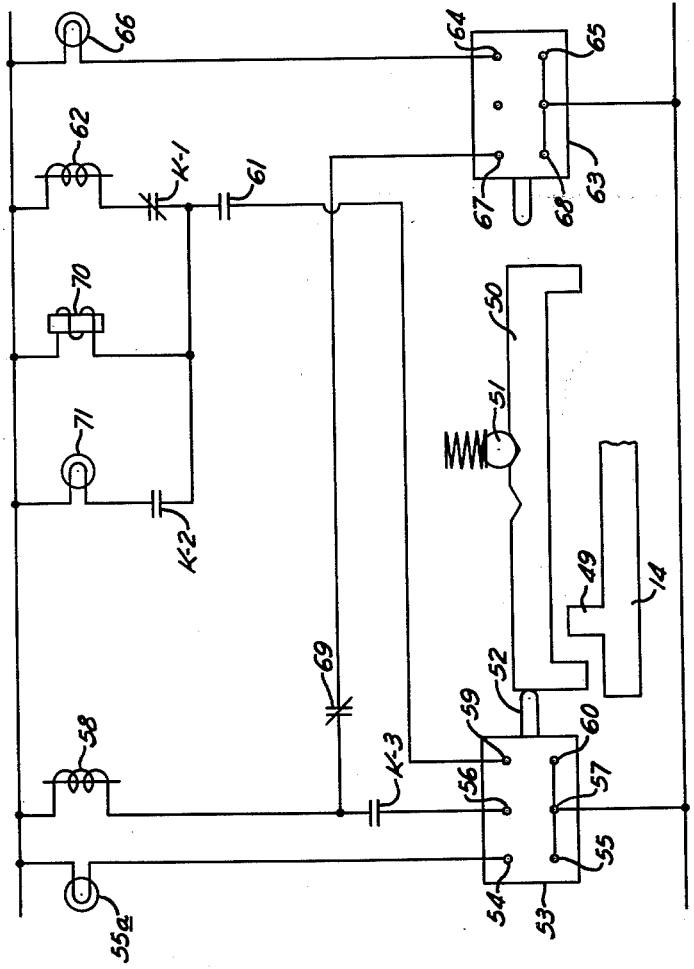
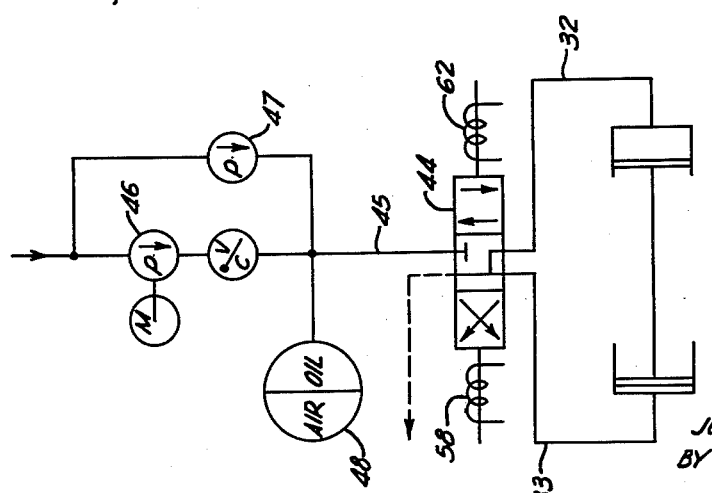

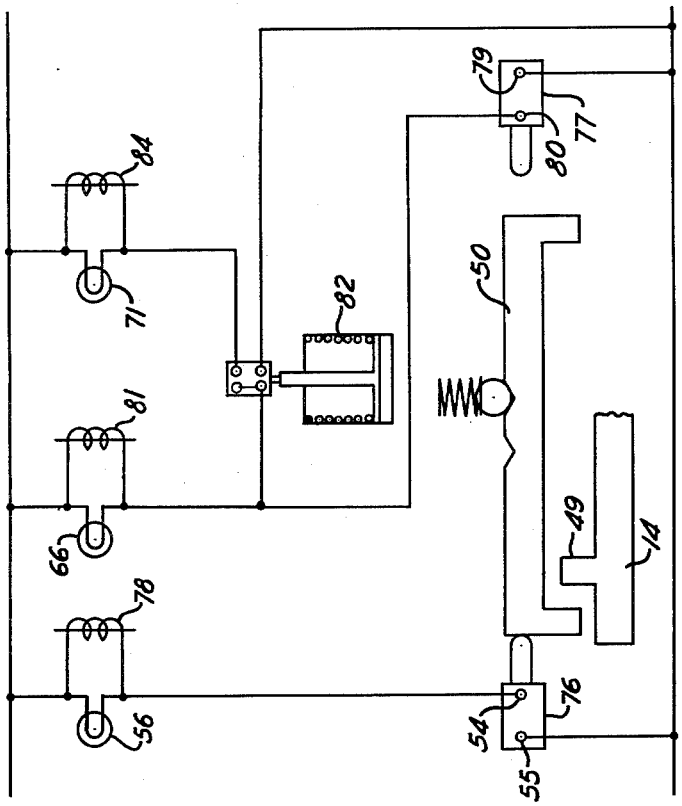
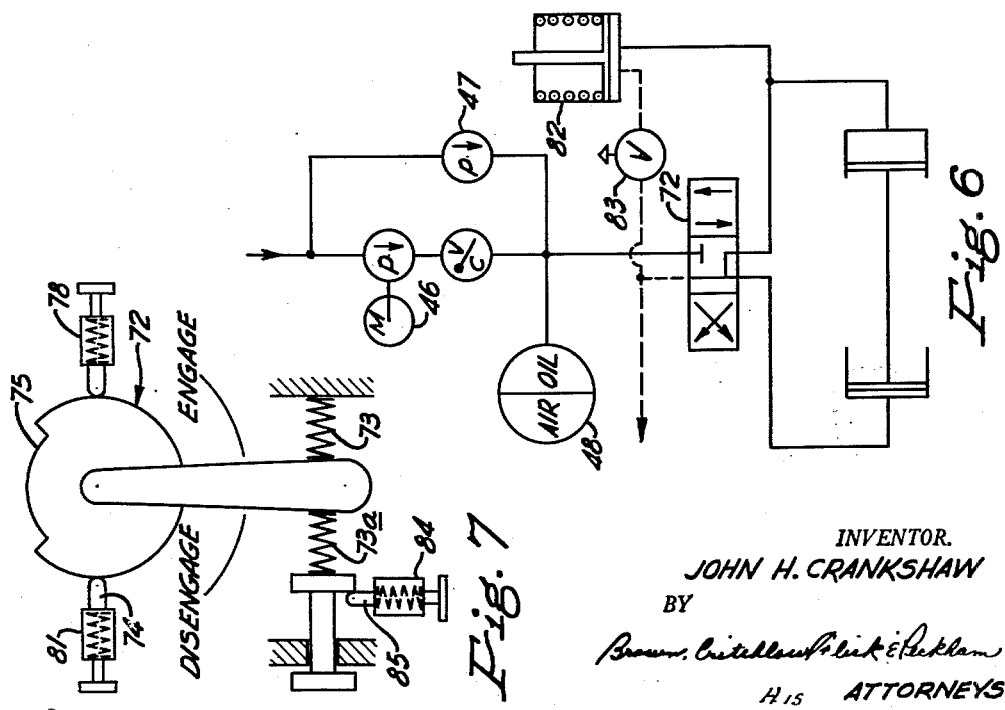

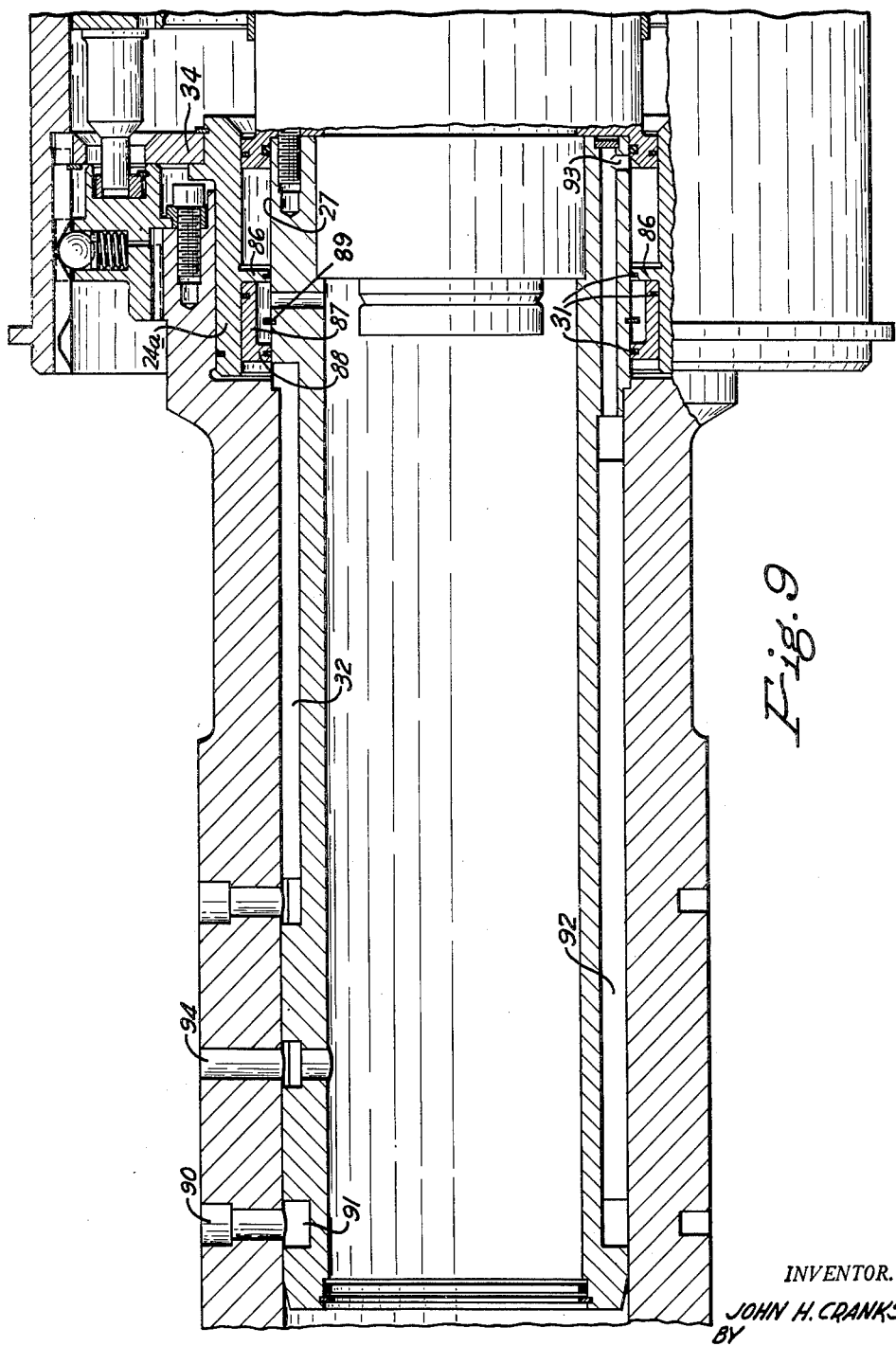

United States Patent Office 3,071,224
Patented Jan. 1, 1963

3,071,224
HIGH SPEED SYNCHRONIZING CLUTCH
John H. Crankshaw, Erie, Pa., assignor to Dynetics, Inc., a corporation of Pennsylvania
Filed Sept. 16, 1959, Ser. No. 840,323
6 Claims. (Cl. 192—53)

This invention relates to a clutch of the type which, when fully engaged, provides a positive mechanical drive between a driving shaft and a driven shaft, and which includes synchronizing means to bring the two shafts into synchronization prior to the engagement of the positive drive members.

Two shafts can be brought into synchronization by means of a friction clutch, which permits slippage between the clutch faces at the start of engagement, but which eventually brings the shafts to same speed. However, to carry heavy loads such clutches must be so large and heavy as to be impractical.

Gear-type couplings permit the transmission of very large torques with very little space or weight difficulty, but such a coupling cannot be engaged while the shafts are in motion unless the shaft speeds are synchronized.

Couplings have previously been devised which make use of the best features inherent in these two types of coupling, i.e., which use a friction clutch to synchronize shaft speeds, and a gear-type coupling to carry the load after engagement of the coupling, but these couplings have been cumbersome and troublesome. The problems involved are especially great in providing a clutch of this type for heavy-duty applications, such as those involved in ship propulsion, power plants, and similar installations.

A known device of this type is shown in Shenk Patent No. 2,640,573, and the present invention provides improvements on the clutch disclosed in this patent. The improvements result in a clutch which is more reliable, while being smaller, lighter and less costly.

These and other objects and advantages of the invention will become apparent as the description proceeds.

In the drawings:

FIG. 1 is a longitudinal section through the coupling showing the parts in disengaged position.

FIG. 2 is a view similar to FIG. 1 but showing the parts in engaged position.

FIG. 3 is a fragmentary section showing details of the balking pin construction.

FIG. 4 is a diagram of a hydraulic control system.

FIG. 5 is a diagram of an electrical system used in conjunction with the hydraulic system of FIG. 4.

FIG. 6 is a view similar to FIG. 4 but showing a different hydraulic control system.

FIG. 7 is a diagram of a manual control valve.

FIG. 8 is a diagram of an electrical system used in conjunction with the hydraulic system of FIG. 6.

FIG. 9 is a fragmentary cross-section of the device of FIG. 1 but showing modifications.

Figure 10:
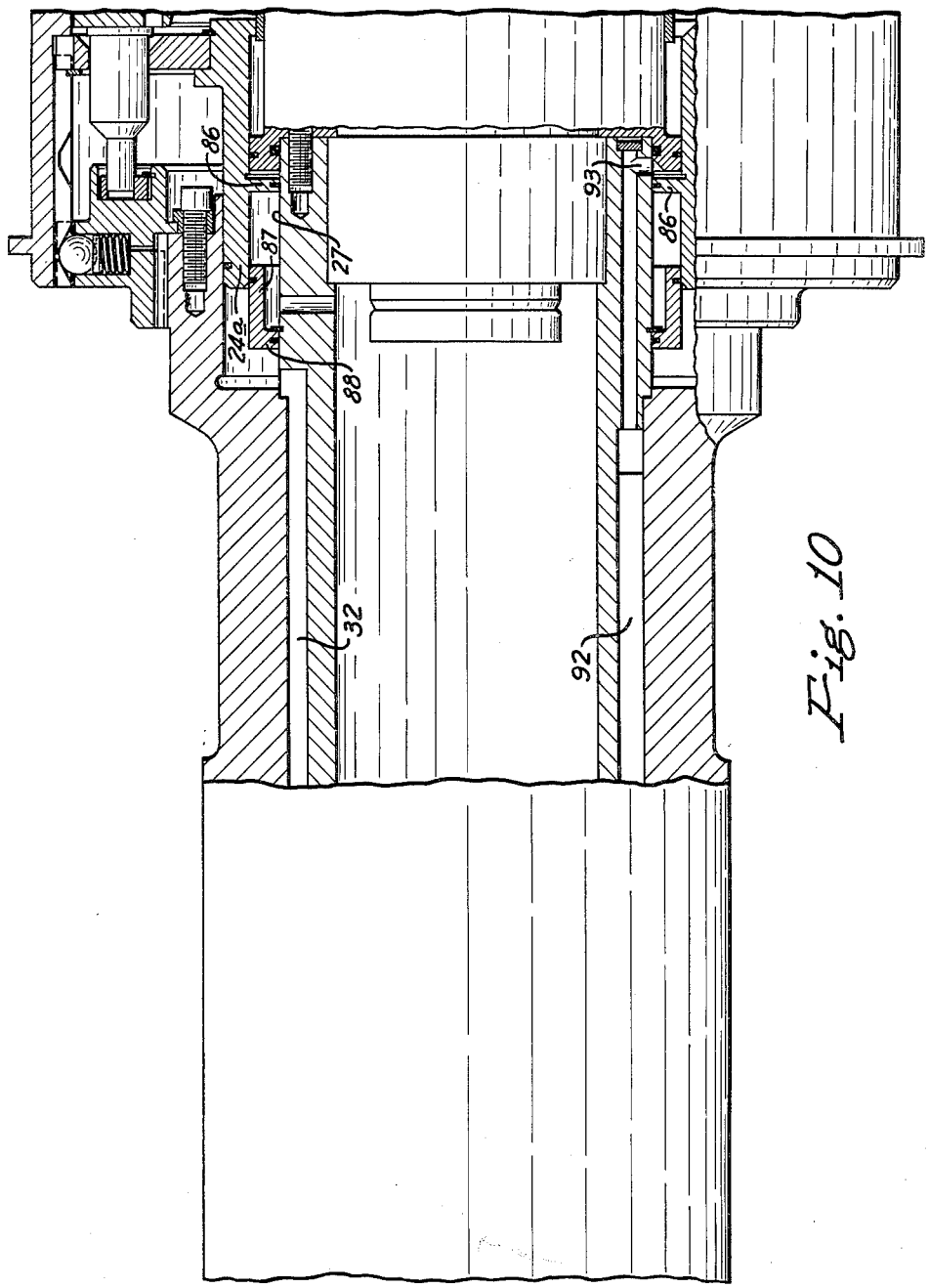
FIG. 10 shows the device of FIG. 9 in the engaged position.

The embodiment illustrated in FIGS. 1 and 2 includes a hub 10 at one end of the clutch assembly, and a hub 11 at the other end, arranged to rotate about a common axis. One of these hubs is adapted to be connected to a continuously rotating prime mover, such as the engine of a ship. The other hub is adapted to be connected to a device to be operated, such as the propeller of a ship. For the purposes of this description, it will be assumed that the hub 10 is connected to the prime mover and it will be referred to as the "input hub." It will be assumed that the hub 11 is connected to the device to be operated, and it will be referred to as the "output hub." It is actually immaterial which hub is connected to the prime mover.

*Coupling Sleeve*

The parts which, when properly engaged, provide a positive mechanical drive from hub 10 to hub 11, include a driving gear 12 formed integral with the input hub 10, a driven gear 13 formed integral with the output hub 11, and a coupling sleeve 14 formed with internal splines which interfit with the teeth of the gears 12 and 13. When the clutch is in disengaged position as shown in FIG. 1, the coupling sleeve 14 is engaged only with the driving gear 12, leaving gear 12 free to idle or rotate independently of gear 13. When the clutch is in fully engaged position, as shown in FIG. 2, the coupling sleeve 14 is engaged over both the driving gear 12 and the driven gear 13, thus forming a positive mechanical interlock from the input hub 10 to the output hub 11.

The coupling sleeve 14 is normally carried in engagement with gear 12, and it is not practical to slide the sleeve 14 over gear 13 until the two gears have been brought into synchronization and have been accurately positioned with the teeth of one gear alined with the teeth of the other gear. The synchronizing and alining of the two gears is accomplished by a disc clutch indicated generally by the numeral 15, in conjunction with a balking pin arrangement indicated generally by the numeral 16.

*Disc Clutch*

Referring more specifically to the disc clutch 15, it will be seen that the clutch discs 17 have inwardly extending teeth which engage in splines 18 formed on an extension of hub 11. The discs 17 are interleaved with discs 19 which have outwardly extending teeth which engage in splines 20 formed on the inner surface of a cup formed on the pressure ring 21. The pack of clutch discs can be compressed between an engaging ring 22, which engages gear 13, and an engaging ring 23, which is engaged by the pressure ring 21.

The pressure ring 21 is mounted for free sliding fit on a tubular extension 21a which extends inward from input hub 10. The pressure ring may be carried by a spherical bearing 21b in order to permit the pressure ring to apply even pressure to the disc clutch 15.

*Operating Means for Clutch and Coupling Sleeve*

The means for operating the clutch and coupling sleeve includes a tubular operating piston 24 mounted inside hub 10. In order to provide for the piston 24, the hub 10 includes an inner hub member 25 and an outer hub member 26. The inner hub member 25 is reduced in diameter at 27 in order to provide an annular cylinder in which tubular piston 24 may operate.

The outer wall of the tubular piston 24 has a close sliding fit with the wall of the outer hub member 26, and its inner end is spaced from the reduced wall 27 of the inner hub member to form a pressure chamber, but its inner end carries an enlargement 28 which engages both walls of the annular cylinder and forms the piston proper.

A sealing ring 29 is mounted over the end of the annular cylinder and retained in place by locking rings 30. Suitable packing rings 31 seal the engaging surfaces where leakage is liable to occur.

An oil passage 32 leads from the end of hub 10 into the bottom of the annular cylinder and a second oil passage 33 leads into the outer end of the pressure chamber. It will be understood that when oil under pressure is introduced through passage 32 into the bottom of the annular cylinder the operating piston 24 is moved toward the right as viewed in FIG. 1, which is the engaging movement. When oil pressure is introduced into the pressure chamber through passage 33 the operating piston 24 is moved toward the left, which is the disengaging movement.

When the operating piston 24 is moved toward the right it carries with it the following parts:

(a) Balking ring 34, which is mounted on and moves with the operating piston 24.

(b) Coupling sleeve 14, since the balking ring 34 pushes against shoulder 35 on the coupling sleeve 14, and overcomes the resistance of ball detent 36.

(c) Pressure ring 21, under influence of ball detent 37, the latter forming a releasable coupling between coupling sleeve 14 and pressure ring 21.

This movement toward the right of pressure ring 21 causes the engaging ring 23 to press the stack of friction discs 17 and 19 against the engaging ring 22, thus causing the disc clutch to tend to bring the speed of rotation of the output hub 11 up to the speed of the input hub 10.

The reaction of the pressure of the operating piston 24 against the disc clutch 15 is taken up by the thrust link 38, which has one end bolted to the output hub 11 and has its other end supported in a thrust bearing 39 carried by input hub 10.

*Balking Pin Mechanism*

It has just been explained how the disc clutch 15 is operated to bring the two hubs to synchronous speed. However, the disc clutch will stop the two shafts in random locations, in many of which the teeth carried by one hub are not properly alined with the teeth on the other hub. If, therefore, the coupling sleeve is forced toward the right as soon as the hubs are brought to synchronous speed by the disc clutch, there would usually result a clashing and perhaps damaging of the teeth.

To avoid this result the balking pin mechanism is provided. This mechanism is used to release the disc clutch to permit slight relative rotation between the hubs, and to simultaneously push the gear teeth into engagement. This balking pin arrangement is brought into play during the motion of the operating piston 24 toward the right.

The balking pin mechanism 16 includes a plurality of cylindrical balking pins 40 (preferably 6) uniformly spaced around the pressure ring 21 and mounted thereon. Each balking pin has a reduced extremity 41 and a cone-shaped cam surface 42 at the junction of the extremity 41 with the main body of the balking pin.

Balking ring 34 is mounted to move with operating piston 24, and the outer surface of the balking ring carries teeth that engage the internal teeth of the coupling sleeve 14, so that the balking ring and coupling sleeve are held in fixed circumferential alinement with each other.

Round guide holes 43 are formed in the balking ring 34 at points spaced to correspond with the spacing of the balking pins. The inner surface of the holes 43 is formed as a cone corresponding in angle with cam surface 42 on the balking pin, and with the smallest diameter of the hole fitting snugly over the main body of the balking pin 40.

The cooperating cam surfaces on the balking pins 40 and the guide holes 43 may be varied somewhat in shape and inclination from those shown to give different operating characteristics to the clutch. The important requirement is that these surfaces furnish momentary resistance to permit the operating piston 24 to apply additional pressure through these cam surfaces to the disc clutch 15, and then permit the balking pins to slide into the guide holes after shaft speeds have been synchronized.

The balking pins 40 may be mounted in cantilever fashion on the pressure ring 21, but it is preferred to support their reduced extremities 41 in a support ring 44, which is rotatably mounted in a recess in the input hub 10. The support ring 44 is formed with holes which have a close fit over the reduced extremities 41, thus mutually supporting the ends of the balking pins and substantially equalizing the bending moments imposed on them.

It will be understood that by the above construction the pressure ring 21, the support ring 44 and the balking pins 40 are free to move as a unit in a slight rotative movement relative to the balking ring 34 during the engaging movement.

*Engaging Movement*

In describing the operation of the mechanism it will be assumed that the parts are rotating in such a direction that the parts above the center line are moving toward the reader.

The result of the construction described is that as the operating piston 24 starts its movement toward the right and the disc clutch 15 starts to engage, there is a drag on the pressure ring 21 causing it to lag behind the rotation of the input hub 10 and the parts keyed to it, including the balking ring 34. This drag, or backward rotation of the pressure ring 21, continues only long enough to permit the reduced extremities 41 of the balking pins to engage the rear surfaces (as viewed in FIG. 1) of the guide holes 43 in the balking ring 34.

As the oil pressure behind the operating piston 24 continues to build up, the piston continues its movement toward the right, and overcoming the resistance of the ball detents 36 and 37, moves the coupling sleeve 14 to the right until the cam surfaces 42 of the balking pins engage the cam surfaces of the guide holes 43, as shown in FIG. 3. With the parts in this position the design is such that axial force of the operating piston 24 now acts only through the balking pin cam surfaces to further compress the disc clutch 15, and this condition continues to exist until slipping stops at the friction discs. The speed of the input and output hubs has now been synchronized, but the teeth of the gear 13 are not necessarily fully alined with the internal teeth of the coupling sleeve 14.

As stated, when the shaft speeds synchronize, slipping stops at the friction surfaces of the disc clutch. The removal of this torque from the system enables the cam surface of the guide holes 43 to ride up the cam surface 42 of the balking pin, thus rotating the balking pins and their related parts backward sufficiently to permit the main body 40 of the balking pins to slide into the guide holes 43.

It will be recalled that just prior to the parts reaching this position, the only pressure being applied to the disc clutch was transmitted through the engagement of the cam surfaces 42 of the balking pins with the cam surfaces of the guide holes 43. Obviously, as soon as the main bodies of the balking pins slide into the guide holes 43 this pressure on the disc clutch is released.

As soon as the disc clutch is released the output hub 11 is free to rotate slowly relative to the input hub 10, and simultaneously the coupling sleeve 14 is pushed farther toward the right to cause the teeth of the coupling sleeve to engage between the teeth of the driven gear 13. The gear teeth on these two members are beveled on their confronting ends in order to permit ready engagement when the members are rotating slowly relative to each other.

It will be seen that this balking pin arrangement serves as a combination release and timing device. It takes over the last stage of applying pressure to the disc clutch, then simultaneously release the clutch and pushes the gears into engagement.

All of the engaging movements are caused by the same fluid pressure, so that the operations are automatically timed by the construction and arrangement of the parts.

By varying the angle of the cooperating cams 42 on the balking pins and the guide holes 43 between certain limits, the coupling can be caused to engage under different conditions of output torque requirement. For example, if the maximum torque developed at the discs be taken as 100%, then by changing the cam angle it is possible to design the coupling so that it will engage when the load torque demand is approximately equal to the maximum friction torque, or 75%, 50%, or some other fraction of the maximum friction torque within the design limits.

To put it another way, the larger the cam angle is, the longer the clutch will wait before it engages, but the less likely it is to engage prematurely, and vice versa.

The balking pin arrangement of the present invention provides a number of distinct practical advantages:

(1) It lends itself to high-speed operation.

(2) The parts can be accurately machined to give a uniform division of load among the balking pins.

(3) It is relatively inexpensive to change the parts to obtained different clutch characteristics by varying the cam angles on the balking pins and guide holes.

It is advisable to bring the coupling sleeve 14 as close as possible to the gear 13 before the final engaging movement. For this purpose the engaging ring 22 of the disc clutch is made axially adjustable relative to gear 13.

This is done by providing the ring 22 with teeth 22a which engage the splines 18 formed on gear 13. A stop ring 42a is provided with internal threads which engage threads formed on the outer periphery of the engaging ring 22. By rotating stop ring 42a relative to gear 13, the engaging ring 22 is moved back and forth relative to the inner face of gear 13.

Lock bolts 43a project from ring 42a and pass through slots formed in the gear 13. These lock bolts provide means for adjusting ring 42a and for locking it in adjusted position.

By use of the adjusting ring 42a it is possible to place the engaging ring 22 in such a position that the leading ends of the teeth on the coupling sleeve 14 are close enough to the teeth of gear 13 that they will engage promptly after the pressure is released on the disc clutch. This arrangement minimizes the sleeve travel required to engage the teeth, reducing the shock of tooth engagement, and permitting simplification of the control system.

Disengaging Movement

To disengage the clutch oil pressure is introduced through oil passage 33 to the right-hand end of the operating cylinder 27 and the operating piston 24 is forced toward the left. Since the force required to disengage the coupling is much smaller than that required during engagement, the smaller effective area of the piston on this side is entirely satisfactory.

As piston 24 moves to the left carrying along the coupling sleeve 14, the coupling sleeve depresses the ball detents 36 in the input hub and becomes disengaged from gear 13. During this movement the balking ring 34 is withdrawn from the balking pins 40, and (during the last part of the sleeve travel) the ball detents 37 engage their groove in the coupling sleeve 14, and move the pressure ring 21 to the left. The pressure ring is thus positively withdrawn from engagement with the disc clutch 15 and is positioned for the next engagement.

With this construction there can be no residual axial force on the disc clutch 15, and the discs are spaced apart from each other by the passage of cooling oil, which is normally supplied continuously.

Controls

One type of control mechanism using a solenoid-operated control valve is illustrated in FIGS. 4 and 5. FIG. 4 is a schematic diagram of the hydraulic system and FIG. 5 is a schematic diagram of the electrical system.

In FIG. 4 the reference numeral 44 indicates a 4-way solenoid-operated valve which controls passage of a fluid to and from the passages 32 and 33 of FIG. 1. This fluid may be special hydraulic oil, or may be regular lubricating oil under pressure.

Oil pressure is supplied to valve 44 through a pressure line 45 by means of a motor-operated pump 46, or a standby hand pump 47. An accumulator 48 holds an emergency supply of oil under pressure.

The main control switch (not shown) is a simple electrical switch with two positions, "engage" and "disengage," which directs current either to the engage control solenoid 62 (FIG. 5) or to the disengage control solenoid 58. FIG. 5 illustrates the parts in the "disengage" position.

FIG. 5 shows that the coupling sleeve 14 carries a flange 49 which cooperates with a sliding control member 50 mounted in the lower case of the clutch. The control slide 50 is held in one of two positions by the ball detent 51. In the position illustrated the clutch, and hence the sliding member 50, is in the "disengage" position.

In the "disengage" position the sliding member 50 has operated the stem 52 of the normally-open multiple contact switch 53 to close contacts as follows:

(a) Contacts 54 and 55, which put on the indicator light 55a, which shows "disengaged."

(b) Contacts 56 and 57, which close a holding circuit to the disengage solenoid 58 of the control valve.

(c) Contacts 59 and 60 which set up a circuit to the "engage" contacts 61 of the circuit to the engage solenoid 62.

If now the main control switch is moved to the "engage" position, the engage contacts 61 are closed to complete the circuit to the engage solenoid 62. The solenoid 62 moves the hydraulic control valve to the engage position, which causes hydraulic fluid to flow through inlet line 32 and moves the coupling sleeve 14 toward the right. As the coupling sleeve reaches its final engaged position, the flange 49 trips control slide 50 to its right-hand or "engaged" position. This movement opens the switch 53 with its related contacts, and closes switch 63, thus closing contacts as follows:

(a) Contacts 64 and 65, which put on the indicator light 66, which shows "engaged."

(b) Contacts 67 and 68, which set up a circuit to the "disengage" contacts 69 of the disengage solenoid 58.

If the clutch does not engage completely within a given length of time, the time-delay relay 70 operates the following contacts:

(a) Opens contact K–1 to open the circuit to the engaging solenoid 62.

(b) Closes contacts K–3 to close the contact to the disengaging solenoid 58.

(c) Closes contact K–2 to close the circuit to the lamp 71, which indicates "rejected."

When the clutch is fully in the "engaged" position, the main control switch may be moved to its "disengage" position, whereupon all parts will be moved to the "disengage" position in the manner previously explained.

It should be noted that the clutch sleeve 14 does not trip the control slide 50 until the sleeve 14 is near the end of its travel in either direction. This lost-motion connection is provided so as to permit the necessary tolerances in locating bearings and parts, and also to give decisive action in operating microswitches 53 and 63.

FIGS. 6, 7 and 8 illustrate a different control arrangement which substitutes a manually-operated 4-way valve 72 for the electrically-controlled valve 44 just described. The means for supplying oil under pressure to the control valve are the same as those just described. Details of the manual control valve are shown in FIG. 7.

Let us assume that the clutch is in the "disengaged" position. The centering springs 73 and 73a normally hold the valve handle in a centered position. If the handle is now moved to the "engage" position, the pin 74 of the "engage" valve solenoid 81 drops into the recessed sector 75 of the valve handle and retains the handle in the "engage" position. Oil under pressure is now admitted to the engaging side of the operating piston 24, and the coupling sleeve 14 moves to the right. ( FIG. 8) As the sleeve nears the end of its travel it trips the slide 50, as before, and this movement of slide 50 opens the switch 76 and closes switch 77.

The opening of switch 76 opens contacts 54 and 55 which puts out the "disengaged" indicator light 56 and opens the circuit through the "disengage" valve solenoid 78.

The closing of switch 77 closes contacts 79 and 80 which are in the following circuits:

(a) Circuit through the "engage" valve solenoid 81, which withdraws pin 74 from the shoulder of sector 75 and permits the valve handle to return to neutral position.

(b) Circuit through the "engage" indicating light 66.

(c) Circuits through the time delay cylinder 82, the "reject" valve solenoid 84, and the "reject" indicator light 71.

Meanwhile oil was admitted and drained from the time delay cylinder 82. The needle valve 83 on the drain from this cylinder is set so that the operating piston 24 and related parts have ample time to complete the coupling movements. But if due to some malfunction, coupling is not completed within the timed delay, the time delay piston closes its switch, thereby energizing the following:

(a) "Engage" valve solenoid 81, which withdraws pin 74 from the shoulder of the sector 75 and permits the valve handle to return to neutral position.

(b) "Reject" valve solenoid 84, which withdraws detent 85 and permits spring 73 to move the valve handle to "disengage" position, thus causing the coupling sleeve 14 to return to its right-hand position.

(c) Circuit through the "reject" signal light 71.

The "reject" valve solenoid 84 is reset manually, and the valve handle may be moved into or out of any position by manually operating the respective pins.

When the coupling is in engaged position, the control handle may be moved to disengaged position, whereupon the parts of the coupling will be moved to the disengaged position in a manner which will be clear from the previous explanation.

The control system just described has the advantage of eliminating the electrically-operated 4-way valve, which is subject to leakage and other maintenance troubles.

Suitable means may be provided for holding the parts in "engaged" position. Thus in FIG. 2 the ball detents 36 are spring-pressed into the groove 95 to maintain the "engaged" position.

A modified form of operating piston is illustrated in FIG. 9. This construction provides a two-piece piston which can be operated with a smaller volume of oil.

In FIG. 9 the cylindrical main piston 24a slides within the operating cylinder 27. A flange 86 projects inwardly from the piston 24a into engagement with the inner wall of cylinder 27. A cup-shaped secondary piston 87 is located within the cylinder and has a flange 88 which extends inwardly to engage the inner wall of the cylinder 27. A snap ring 89 projects from the inner wall of cylinder 27 and provides a stop for the secondary piston 87 after a predetermined amount of travel. Packing rings 31 are provided to prevent fluid leakage.

The operation of this form of the operating cylinder is as follows:

When oil is admitted to the inlet passage 32 the oil pressure operates on the end of main piston 24a and on the end of secondary piston 87. This full pressure against the combined piston area is applied to move the balking ring 34. As soon as the main diameter of the balking pins enters the guide hole 43, the secondary piston 87 hits the stop ring 89 and its further movement toward the right is prevented. The main piston 24a now continues its movement toward the left to complete the engagement of the clutch. This latter movement requires only half the volume of oil that would be otherwise required, because the areas of the ends of the pistons 24a and 87 are equal. The use of a smaller volume of oil is made possible by the fact that after synchronization is reached, less force is needed to complete the clutch engagement.

For disengagement, oil is admitted through port 90. It passes around the circumferential groove 91, through milled slot 92 and holes 93 to reach cylinder 27 behind the flange 86 of the main piston 24a. As the main piston 24a moves back toward the disengage position, it retracts the clutch members and strikes the end of secondary piston 87, returning it to its original position.

Cooling oil is supplied to the clutch parts by way of port 94. The bulk of this oil eventually passes out radially through grooves in the clutch plates.

Conclusion

Those skilled in this art will understand that the device of this invention has the following outstanding advantages:

(1) The operating piston is located within one of the hubs, thus producing a compact, small-diameter construction.

(2) All of the operating components are located inside the coupling sleeve.

(3) All radially installed parts, such as ball detents, are covered by major components of the device, so there is no possibility of accident due to oversight at assembly, retainer failure, etc.

(4) The small-diameter, symmetrical design lends itself to high-speed as well as low-speed operation. This makes it possible to apply the clutch to either the input or the output side of a given system.

(5) Due to the location of the operating parts, all of the piping and electrical connections can be made in the lower half of the case. This simplifies removal of the clutch unit from the case, without disturbing the lower half of the case.

(6) There is no piping outside the case, where it would be vulnerable to damage.

(7) The thrust link, while permitting rotation of the hubs when disengaged, takes the reaction force from operation of the piston during engagement. This does away with the necessity of designing the case and its foundations to carry this reaction force, as required in other devices of this general nature. The thrust link also transmits axial forces in the line of shafting as may be required for positioning gears, etc.

(8) The construction provides for minimum travel of the coupling sleeve, thereby permitting simplification of the control system.

(9) The balking pin arrangement permits easy substitution of balking pins with different cam angles to provide different operating characteristics from a single size and design of clutch.

These, and other objects and advantages of the invention will be apparent to those skilled in the art.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A synchronizing clutch of the type comprising driving and driven hubs having external gear teeth, a coupling sleeve adapted to fit over both hubs and having internal splines formed to mesh with the teeth on the hubs to form a positive connection between the hubs, a friction clutch interconnected between the two hubs, the improvement which comprises:

(a) tubular piston means operating in a tubular cylinder formed in a first hub;

(b) the friction clutch being in the form of a disc clutch mounted on an extension carried by a second hub;

(c) a pressure ring slidably mounted on an extension carried by said first hub and constructed and adapted to apply pressure to the disc clutch;

(d) a primary means for operating the pressure ring, said primary operating means comprising the coupling sleeve, a positive connection between the coupling sleeve and the tubular piston, and a pressure-yieldable connection between the coupling sleeve and the pressure ring;

(e) and a secondary means for operating the pressure ring, said secondary operating means comprising a balking ring mounted on said piston means and having a plurality of guide holes and a plurality of cylindrical balking pins adapted to pass into the guide holes, the guide holes and balking pins having cooperating cam surfaces which are temporarily engaged to apply final pressure to the disc clutch, the parts being constructed and arranged so that when the speed of the two hubs is synchronized, the balking pins pass into the guide holes, thereby releasing the disc clutch and permitting the coupling sleeve to move over the teeth of the second hub to complete the engagement of the clutch.

2. A device as specified in claim 1 in which the balking ring is operatively integral with the tubular piston, and the balking pins are mounted on the pressure ring and are disposed axially of the coupling.

3. A device as specified in claim 1 in which each balking pin is rigidly mounted on the pressure ring and has a reduced extremity which extends through a guide hole.

4. A device as specified in claim 3 in which a support ring is slidably mounted in said first hub and the reduced extremities of the balking pins fit closely in openings formed in the support ring.

5. A synchronizing clutch of the type comprising driving and driven hubs having external gear teeth, a coupling sleeve adapted to fit over both hubs and having internal splines formed to mesh with the teeth on the hubs to form a positive connection between the hubs, a friction clutch interconnected between the two hubs, the improvement which comprises:

(a) hydraulically-operated piston means located within a first hub and constructed and arranged to apply pressure to move the friction clutch toward and away from engaging position;

(b) means constructed and arranged to transmit pressure from said piston means to the clutch, said transmitting means including the coupling sleeve;

(c) hydraulically-operated means enclosed within the coupling sleeve and constructed and arranged to release the friction clutch and simultaneously to complete the coupling movement by pushing the coupling sleeve into engaged position;

(d) a thrust link located axially of the coupling, the thrust link being rigidly mounted in one of said hubs and being connected by a thrust bearing to the other hub.

6. A synchronizing clutch of the type comprising driving and driven hubs having external gear teeth, a coupling sleeve adapted to fit over both hubs and having internal splines formed to mesh with the teeth on the hubs to form a positive connection between the hubs, a friction clutch interconnected between the two hubs, the improvement which comprises:

(a) hydraulically-operated piston means located within a first hub and constructed and arranged to apply pressure to move the friction clutch toward and away from engaging position;

(b) means constructed and arranged to transmit pressure from said piston means to the clutch, said transmitting means including the coupling sleeve;

(c) hydraulically-operated means enclosed within the coupling sleeve and constructed and arranged to release the friction clutch and simultaneously to complete the coupling movement by pushing the coupling sleeve into engaged position;

(d) the piston means recited in element (a) comprising a tubular main piston, and a tubular secondary piston operating within the main piston and constructed and arranged to supplement the force of the main piston during certain periods of operation.

References Cited in the file of this patent

UNITED STATES PATENTS

| 2,070,813 | Stearns et al. | Feb. 16, 1937 |
|---|---|---|
| 2,422,155 | Wemp | June 10, 1947 |
| 2,571,267 | Ljunggren | Oct. 16, 1951 |
| 2,640,573 | Shenk | June 2, 1953 |
| 2,883,021 | Hill | Apr. 21, 1959 |

UNITED STATES PATENT OFFICE

CERTIFICATE OF CORRECTION

Patent No. 3,071,224                              January 1, 1963

John H. Crankshaw

It is hereby certified that error appears in the above numbered patent requiring correction and that the said Letters Patent should read as corrected below.

Column 1, line 17, before "same" insert -- the --; column 2, line 53, for "mmeber" read -- member --; column 4, line 69, for "release" read -- releases --; column 6, line 45, for "contacts" read -- contact --; column 7, line 35, for "in engaged position" read -- in "engaged" position --; line 36, for "to disengaged position" read -- to "disengaged" position --.

Signed and sealed this 9th day of July 1963.

(SEAL)
Attest:

ERNEST W. SWIDER                              DAVID L. LADD
Attesting Officer                                Commissioner of Patents